(No Model.)

M. GINORIS.
ARTIFICIAL FRUIT.

No. 340,870. Patented Apr. 27, 1886.

WITNESSES:
Chas. Nida
C. Sedgwick

INVENTOR:
M. Ginoris
BY Munn & Co.
ATTORNEYS.

UNITED STATES PATENT OFFICE.

MARIE GINORIS, OF NEW YORK, N. Y.

ARTIFICIAL FRUIT.

SPECIFICATION forming part of Letters Patent No. 340,870, dated April 27, 1886.

Application filed December 29, 1885. Serial No. 186,989. (No model.)

*To all whom it may concern:*

Be it known that I, MARIE GINORIS, of the city, county, and State of New York, have invented a new and Improved Method of Making Artificial Fruit, of which the following is a full, clear, and exact description.

Reference is to be had to the accompanying drawings, forming a part of this specification, in which similar letters of reference indicate corresponding parts in all the figures.

Figure 1:
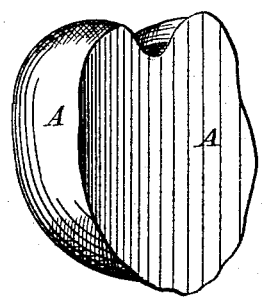
Figure 2:
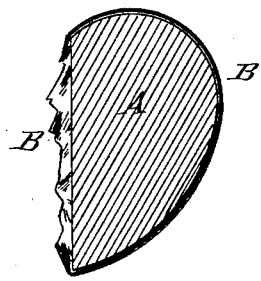
Figure 3:
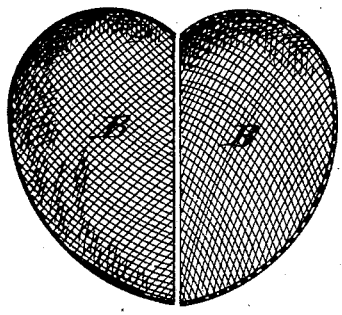
Figure 4:
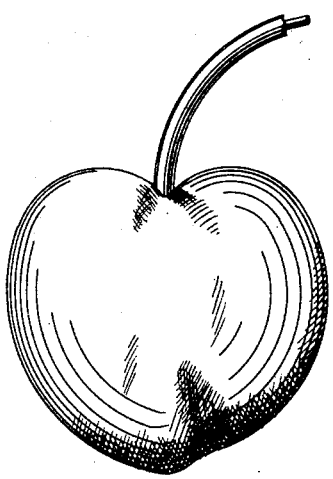

Figure 1 is a perspective view of one part of a mold. Fig. 2 is a sectional elevation of the same, and showing the cloth upon it. Fig. 3 is a sectional elevation of the two parts of the cloth body before being connected. Fig. 4 represents an artificial peach made in accordance with my improvement.

The object of this invention is to provide an improved method of making artificial fruit, by the use of which the fruit can be made to more nearly represent real fruit than is possible when made in the ordinary manner.

The invention consists in the method of making artificial fruit hereinafter fully described.

In carrying my invention into practical effect I form a mold, A, of wood or other suitable material, which shall exactly represent the fruit to be imitated, and which may be solid or hollow, as may be desired. The mold A is made in two equal parts or halves.

Upon each half of the mold A is placed a piece, B, of buckram or other suitable cloth, wet with glue, paste, or other suitable cement, so that it can be closely fitted to the mold A, and made to exactly conform to all the depressions and projections of the said mold. The cemented cloth B, while still upon the mold, is thoroughly dried by placing it in a stove-oven or other suitable furnace, or by exposing it to the air. When the cemented cloth B is fully dried, its projecting edges are cut off smoothly and close to the plane edges or surfaces of the parts of the mold A. The cloths are then removed from the parts of the mold, and will retain the exact form given them by the said mold. The edges of the two cloths B are then brought together and cemented to each other, and will form a body having the exact shape of the mold, and being thus an exact imitation of the form of the fruit. If desired, the joint between the edges of the two cloths can be strengthened by cementing a strip of fine cloth to the said cloths over the said joint. The body of the fruit thus formed is then thoroughly dried, and is then covered with a thick coat of paint, and colored to represent the fruit to be imitated.

By this invention artificial fruit can be formed that will exactly represent the fruit to be imitated in form and color.

When the edges of the two pieces of cloth that form the body of the fruit are being cemented together, the end of a piece, C, of wire is introduced between the said edges at the place where the stem is to be, and the said wire is then covered with paper, cloth, or other suitable material, and is painted to represent the natural stem of the fruit.

Having thus fully described my invention, I claim as new and desire to secure by Letters Patent—

The method of making artificial fruit herein shown and described, which consists in forming a mold of the exact shape of the fruit to be imitated, and made in two parts, then covering the curved surfaces of the parts of the mold with cloth wet with cement, then drying the cloths, then cutting off the projecting edges of the cloths, then removing the cloths from the parts of the mold, then cementing the edges of the cloths to each other with a wire stem inserted between them, and then painting the body thus formed to represent the fruit, all as set forth.

MARIE GINORIS.

Witnesses:
JAMES T. GRAHAM,
C. SEDGWICK.